United States Patent
Mitsuhara

(10) Patent No.: US 11,855,951 B2
(45) Date of Patent: Dec. 26, 2023

(54) METHOD USED IN A MESSAGE POSTING ASSISTANCE SERVICE THAT ASSISTS A USER IN POSTING A MESSAGE INCLUDING THUMBNAIL IMAGE DATA AND TEXT DATA TO A MESSAGE SHARING SERVICE

(71) Applicant: Atsushi Mitsuhara, Osaka (JP)

(72) Inventor: Atsushi Mitsuhara, Osaka (JP)

( * ) Notice: Subject to any disclaimer, the term of this patent is extended or adjusted under 35 U.S.C. 154(b) by 0 days.

(21) Appl. No.: 18/184,128

(22) Filed: Mar. 15, 2023

(65) Prior Publication Data
US 2023/0336518 A1    Oct. 19, 2023

(30) Foreign Application Priority Data

Apr. 19, 2022   (JP) ................. 2022-068627

(51) Int. Cl.
G06F 16/955       (2019.01)
H04L 51/52        (2022.01)
H04L 51/063       (2022.01)

(52) U.S. Cl.
CPC ............ H04L 51/52 (2022.05); G06F 16/955 (2019.01); H04L 51/063 (2013.01)

(58) Field of Classification Search
CPC ..... H04L 51/52; H04L 51/224; H04L 51/063; G06F 16/955
See application file for complete search history.

(56) References Cited

U.S. PATENT DOCUMENTS

| 2012/0246594 A1* | 9/2012 | Han | G06F 40/166 |
| | | | 715/781 |
| 2018/0262452 A1* | 9/2018 | Guthery | G06Q 30/0601 |
| 2019/0130046 A1* | 5/2019 | Oonishi | G06F 16/972 |
| 2021/0118065 A1* | 4/2021 | Li | G06Q 50/01 |

FOREIGN PATENT DOCUMENTS

JP    2021157761    10/2021

OTHER PUBLICATIONS

Chun-Ning Tsao et al., Thumbnail Image Selection for VOD services, Mar. 1, 2019, IEEE Conference on Multimedia Information Processing and Retrieval, pp. 54-59 (Year: 2019).*
Xu Cheng et al., Coordinate Live Streaming and Storage Sharing for Social Media Content Distribution, Dec. 1, 2012, IEEE Transactions on Multimedia, vol. 14, No. 6, pp. 1558-1565 (Year: 2012).*

* cited by examiner

*Primary Examiner* — Tam T Tran
(74) *Attorney, Agent, or Firm* — Renner, Otto, Boisselle & Sklar, LLP

(57) ABSTRACT

A method includes providing a user terminal with page data for rendering a message posting assistance page that includes a first window and a proceed button. The present method also includes accepting text data via the first window. The present method further includes accepting, via the first window, a video URL for identifying video data. The present method further includes proceeding with automatic processing in response to a single press of the proceed button. The automatic processing includes: (a) moving or copying the text data from the first window to a clipboard of the user terminal; and (b) downloading the thumbnail image data from the video sharing service based on the video URL and storing the thumbnail image data in an image folder of the user terminal.

9 Claims, 7 Drawing Sheets

METHOD USED IN A MESSAGE POSTING ASSISTANCE SERVICE THAT ASSISTS A USER IN POSTING A MESSAGE INCLUDING THUMBNAIL IMAGE DATA AND TEXT DATA TO A MESSAGE SHARING SERVICE

RELATED APPLICATIONS

This application claims the benefit of Japanese patent application No. 2022-068627 filed on Apr. 19, 2022. Which is herein incorporated by reference in its entirety.

TECHNICAL FIELD

The present disclosure relates to a method to be used in a message posting assistance service that assists user work for posting a message including thumbnail image data and text data to a message sharing service.

BACKGROUND

Social networking services include video sharing services for mainly sharing videos, and message sharing services for mainly sharing messages. The video sharing services include YouTube, for example. The message sharing services include Twitter, for example.

A user may have accounts on both a video sharing service and a message sharing service. The user may wish to use the message sharing service and let the user's followers know that a video has been posted on the video sharing service.

JP2021-157761 discloses a video posting system allowing a user to notify followers via a social networking service (SNS) or a website that a video has been posted. The video posting system includes a posting server and a distributor terminal. The posting server includes: a reception unit that receives a video from the distributor terminal; a posting unit that posts the received video to video posting services; a creation unit that creates a message indicating that the video has been posted; and a notification unit that posts the message to an SNS or a website. For example, by creating a notice based on keyword information, creating a thumbnail image of the posted video, and/or extracting a very small part of the posted video, the creation unit creates a message that includes at least one of a notice, a thumbnail image, a part of the posted video, or a link to the posted video. Such a video posting system assists user work for posting a message including thumbnail image data and text data to a message sharing service.

Usually, video sharing services are run by video sharing service providers, and message sharing services are run by message sharing service providers. The video posting system (message posting assistance service) disclosed in JP2021-157761 is run by a message posting assistance service provider.

Video sharing service providers update video sharing services on a regular or irregular basis, and similarly, message sharing service providers also update message sharing services on a regular or irregular basis. If updates to a video sharing service or a message sharing service affect the message posting assistance service, the message posting assistance service provider needs to update the message posting assistance service in conformity with such updates.

In order to alleviate the burden on the message posting assistance service provider, it is desirable that the message posting assistance service is not readily affected by updates to video sharing and message sharing services.

SUMMARY

A method according to one aspect of the present disclosure is a method to be used in a message posting assistance service that assists user work for posting a message including thumbnail image data and text data to a message sharing service, the thumbnail image data relating to video data posted to a video sharing service, the text data being accepted via a user terminal, and the message sharing service being different from the video sharing service. The present method includes providing the user terminal with page data for rendering a message posting assistance page that includes a first window and a proceed button. The present method also includes accepting the text data via the first window. The method further includes accepting, via the first window, a video URL for identifying the video data. The present method further includes proceeding with automatic processing in response to a single press of the proceed button. The automatic processing includes: (a) moving or copying the text data from the first window to a clipboard of the user terminal; and (b) downloading the thumbnail image data from the video sharing service based on the video URL and storing the thumbnail image data in an image folder of the user terminal.

DETAILED DESCRIPTION

Figure 1:
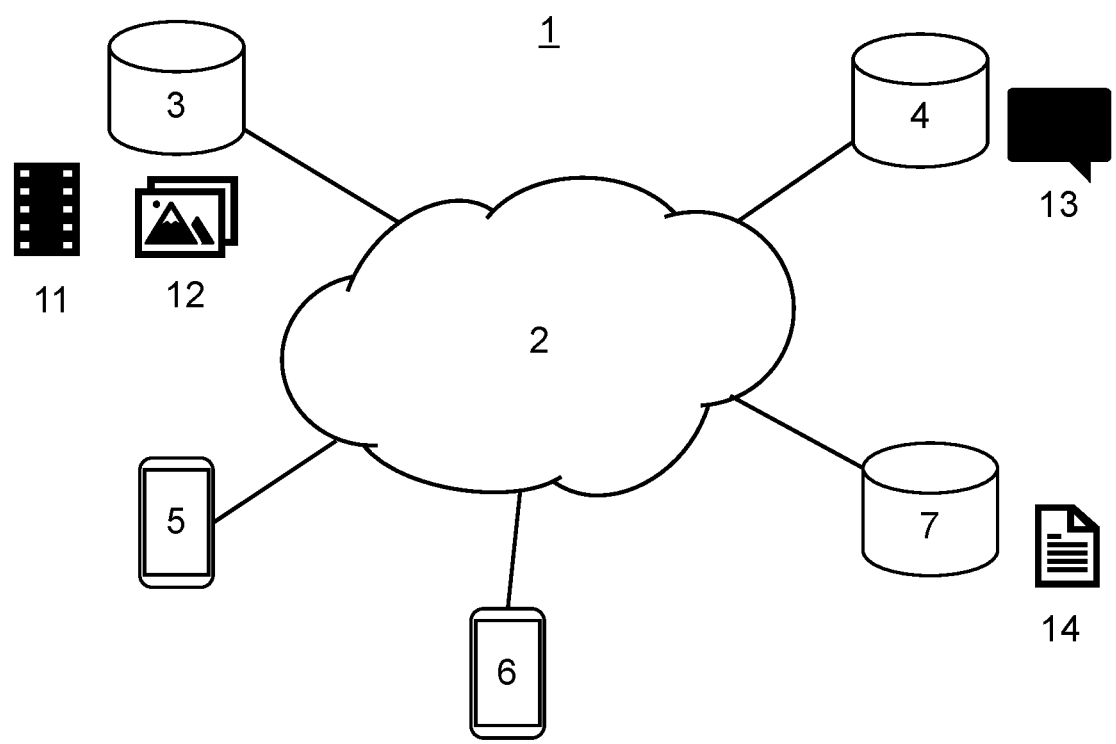
FIG. 1 is a block diagram illustrating a system.

As illustrated in FIG. 1, a system 1 includes a video sharing service 3, a message sharing service 4, and a message posting assistance service 7. In the present embodiment, the video sharing service 3 is run by a video sharing service provider. The message sharing service 4 is run by a message sharing service provider that is different from the video sharing service provider. The message posting assistance service 7 is run by a message posting assistance service provider that is different from either the video sharing service provider or the message sharing service provider.

The system 1 further includes a user terminal 5 and a user terminal 6. The user terminal 5 can access the video sharing service 3, the message sharing service 4, and the message posting assistance service 7 via the Internet 2. The user terminal 5 includes a web browser, and can render webpages using the web browser. The user terminal 5 includes a clipboard for temporary storing text data, image data, and other types of data. The clipboard may be a temporary storage area in a memory of the user terminal 5. The user terminal 5 further includes an image folder for storing image data over a long period of time. For example, the user terminal 5 is a smartphone or a personal computer. The user terminal 6 is similar to the user terminal 5.

In the present embodiment, the user terminal 5 is possessed by a poster who posts video data 11 and a message 13. The user terminal 6 is possessed by a viewer who views the video data 11 and the message 13.

The video sharing service 3 stores the video data 11 and thumbnail image data 12 generated based on the video data 11. The video data 11 has a Universal Resource Locator (video URL) for identifying a logical or physical resource in the system 1. Similarly, the thumbnail image data 12 also has a thumbnail image URL. The video sharing service 3 manages the video URL and the thumbnail image URL.

The video sharing service 3 receives the video data 11 from the user terminal 5, and stores the received video data 11. The video sharing service 3 receives a request to distribute the video data 11 from the user terminal 6, and transmits the video data 11 to the user terminal 6. That is, the poster can post a video to the video sharing service 3. The viewer can view, via the video sharing service 3, the video posted by the poster.

Furthermore, the video sharing service 3 receives a thumbnail image distribution request including the video URL from the user terminal 5, identifies the thumbnail image URL from the video URL, identifies the thumbnail image data 12 from the thumbnail image URL, and transmits the thumbnail image data 12 to the user terminal 5.

The message sharing service 4 receives the message 13 from the user terminal 5, and stores the message 13 so that the message 13 can be accessed from the user terminal 6. That is, the poster can post the message 13 to the message sharing service 4. The viewer can view the message 13 via the message sharing service 4.

For example, the message 13 includes text data created by the poster, and the thumbnail image data 12 created by the video sharing service 3. For example, the text data may include text for letting the viewer know that the poster has posted the video data 11 to the video sharing service 3.

The message posting assistance service 7 provides a service that assists user work for posting the message 13. The message posting assistance service 7 stores page data 14 for rendering a message posting assistance page.

The message posting assistance service 7 may be provided by a computer that includes at least one processor and a memory connected to the at least one processor. The memory may store a program for causing the computer to execute the processing described in the following.

Figure 2:
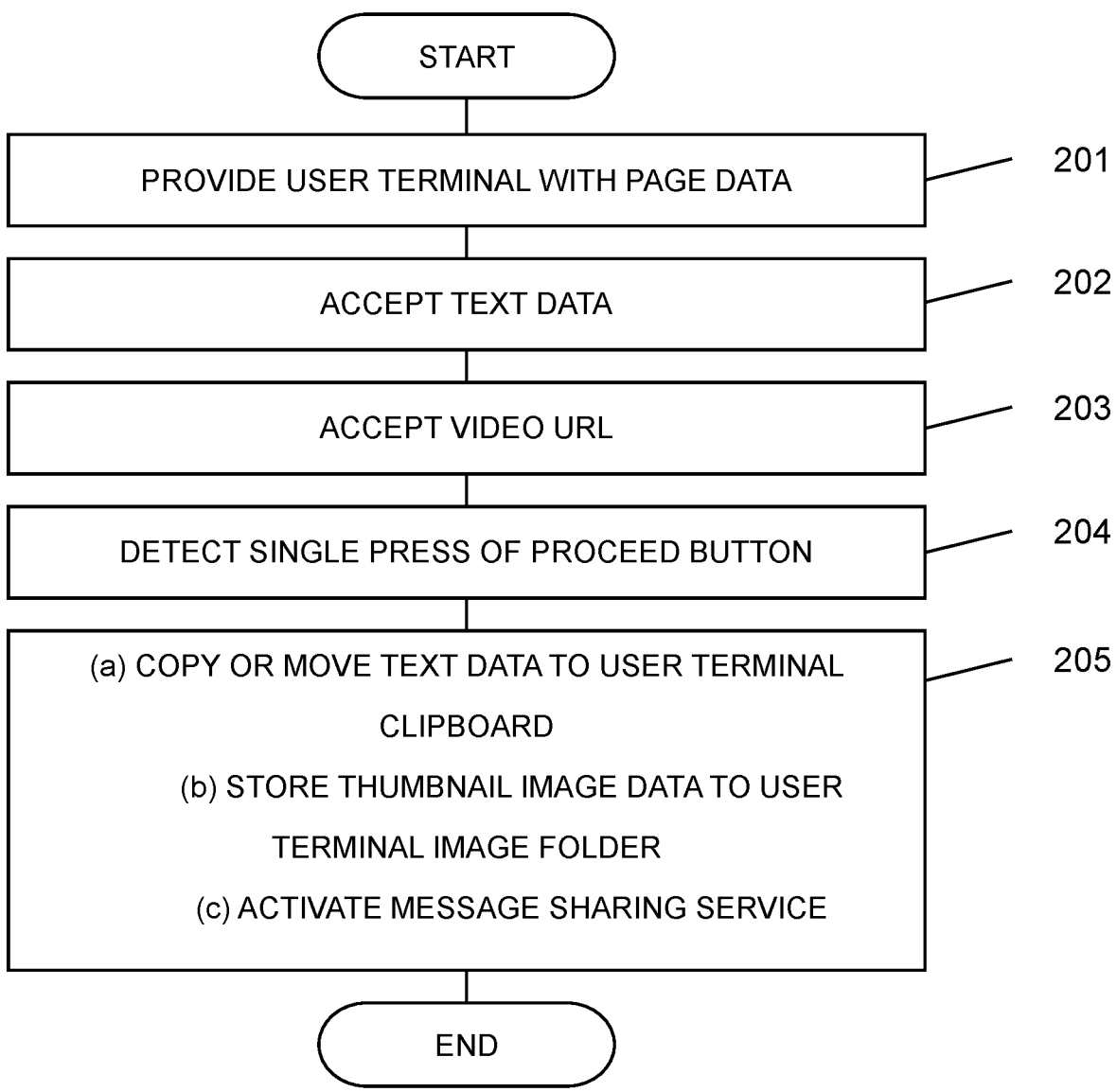
FIG. 2 is a flowchart illustrating an example of processing executed by a message posting assistance service.

FIG. 2 is a flowchart illustrating an example of processing executed by the message posting assistance service 7.

Figure 4:
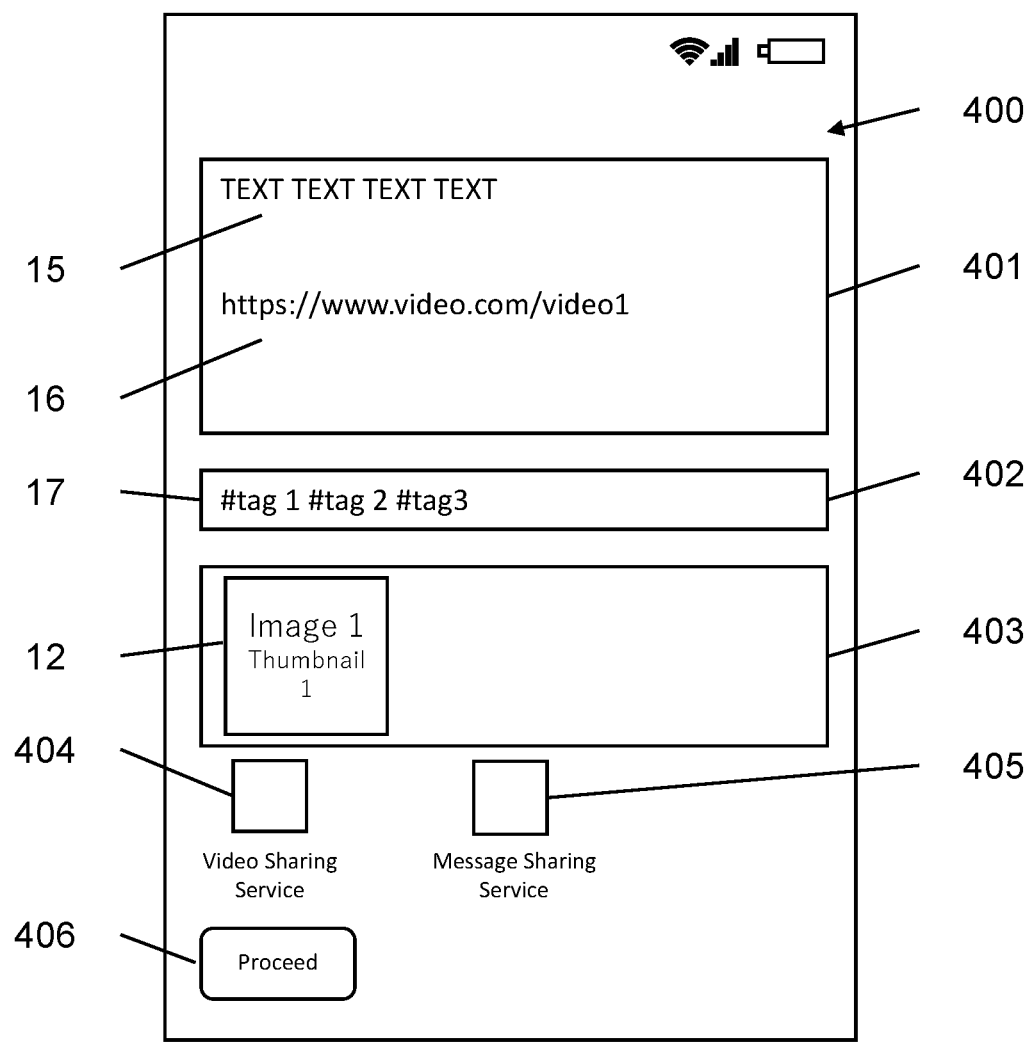
FIG. 4 illustrates an example of a message posting assistance page provided by the message posting assistance service.

In block 201, the message posting assistance service 7 (computer) provides the user terminal 5 with page data. For example, the message posting assistance service 7 transmits the page data 14 to the user terminal 5 in response to a request from the user terminal 5. As illustrated in FIG. 4, using the browser, the user terminal 5 renders a message posting assistance page 400 based on the page data 14.

The message posting assistance page 400 may include a first window 401, a second window 402, and a third window 403. The first window 401 is a window for accepting text data 15 and a video URL 16 from the poster. The second window 402 is a window for presenting one or more recommended hashtags 17 to the poster. The third window 403 is a window for displaying a preview of the thumbnail image data 12.

The message posting assistance page 400 may further include a first icon 404, a second icon 405, and a proceed button 406. The first icon 404 is an icon for activating the video sharing service 3. The second icon 405 is an icon for activating the message sharing service 4. The proceed button 406 is a button for accepting an instruction to proceed with automatic processing from the poster. The message posting assistance service 7 detects a press of the first icon 404 and activates an application corresponding to the video sharing service 3 (or activates the video sharing service 3 via the browser). The message posting assistance service 7 detects a press of the second icon 405 and activates an application corresponding to the message sharing service 4 (or activates the message sharing service 4 via the browser).

Returning to FIG. 2, in block 202, the message posting assistance service 7 accepts the text data 15 via the message posting assistance page 400 (specifically, via the first window 401). The text data 15 may be input by the poster via a keyboard displayed on the user terminal 5.

As illustrated in FIG. 4, the message posting assistance service 7 may present at least one recommended hashtag 17 in the second window 402. The message posting assistance service 7 may store hashtags used by the poster in the past, and present the stored hashtags in the second window 402. The message posting assistance service 7 may automatically generate hashtags relating to the text data 15, the video data 11, data of the geographic location of the user terminal 5, and other types of data, and present the generated hashtags in the second window 402. The message posting assistance service 7 may detect a press of a hashtag in the second window 402, and move or copy the pressed hashtag from the second window 402 to the first window 401.

In block 203, via the message posting assistance page 400 (specifically, via the first window 401), the message posting assistance service 7 accepts the video URL 16 for identifying the video data 11.

In block 204, the message posting assistance service 7 detects a single press of the proceed button 406 in the message posting assistance page 400.

In block 205, detecting the single press of the proceed button 406, the message posting assistance service 7 performs the automatic processing.

The automatic processing includes (a) moving or copying the text data 15 from the first window 401 to the clipboard of the user terminal 5. The automatic processing further includes (b) downloading the thumbnail image data 12 from the video sharing service 3 based on the video URL 16 and storing the thumbnail image data 12 in the image folder of the user terminal 5. The image folder may be a storage area in the memory of the user terminal 5. Photos and images may be stored in the image folder. The message posting assistance service 7 may alter at least one of the size, resolution, and image compression format of the downloaded thumbnail image data 12, and store the altered thumbnail image data 12 in the image folder. As a result of the above-described automatic processing, preparation for posting the message 13 including the thumbnail image data 12 and the text data 15 to the message sharing service 4 is completed.

Figure 5:
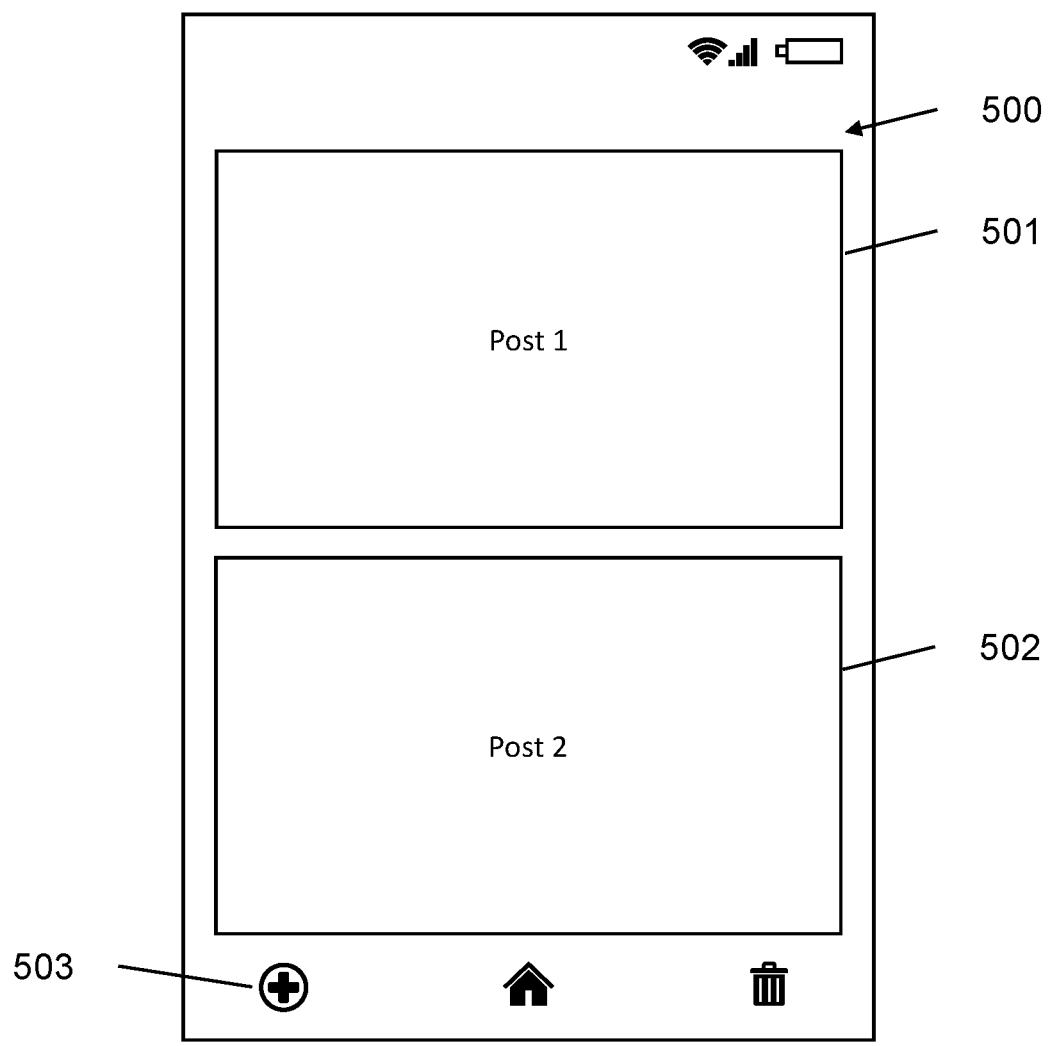
FIG. 5 illustrates an example of a main page provided by a message sharing service.
Figure 6:
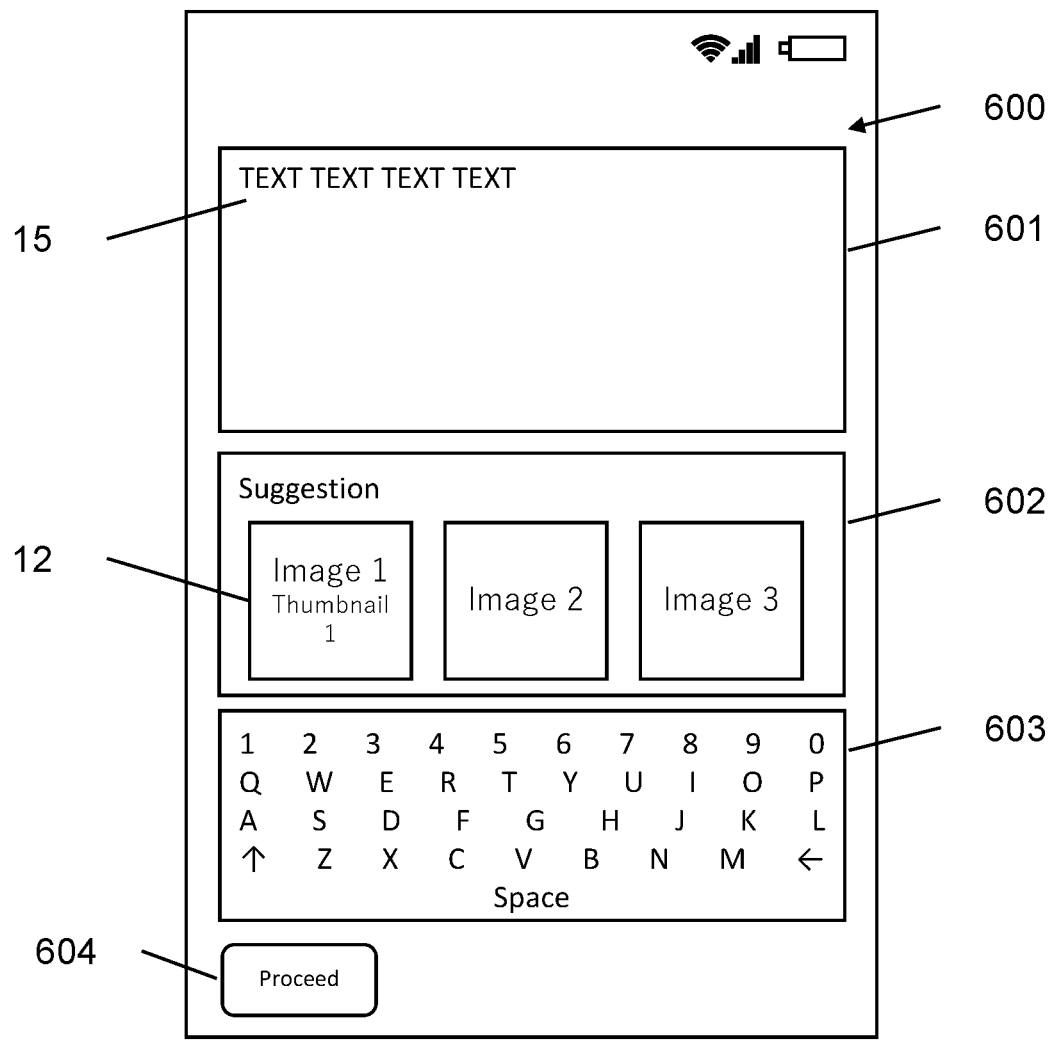
FIG. 6 illustrates an example of a new message creation page provided by the message sharing service.

The message sharing service 4 provides the user terminal 5 with a main page 500 as illustrated in FIG. 5, for example. The main page 500 includes a message 501 and a message 502. The main page 500 further includes a new message creation button 503. The message sharing service 4 detects a press of the new message creation button 503 and provides the user terminal 5 with a new message creation page 600 as illustrated in FIG. 6.

The new message creation page 600 includes a fourth window 601. The fourth window 601 is a window for creating the message 13. The text data 15 is already stored in the clipboard. For example, the message sharing service 4 detects a press of the fourth window 601, and presents a button for accepting an instruction to move or copy data stored in the clipboard to the fourth window 601. Detecting a press of the button, the message sharing service 4 moves or copies the text data 15 from the clipboard to the fourth window 601. That is, the poster can input the text data 15 to the fourth window 601 by just pressing a button.

The new message creation page 600 further includes a fifth window 602. The fifth window 602 is a window for presenting image data stored in the image folder of the user terminal 5. The thumbnail image data 12 is already stored in the image folder. For example, the message sharing service 4 detects a press of the thumbnail image data 12 presented in the fifth window 602, and moves or copies the thumbnail image data 12 from the image folder to the fourth window 601. That is, the poster can move or copy the thumbnail image data 12 to the fourth window 601 by just pressing the thumbnail image data 12.

The new message creation page 600 further includes a keyboard 603. The new message creation page 600 further includes a proceed button 604. Detecting a press of the proceed button 604, the message sharing service 4 posts the message 13 (including the thumbnail image data 12 and the text data 15) input to the fourth window 601.

As described above, the message posting assistance service 7 stores the text data 15 and the thumbnail image data 12 in the clipboard and the image folder of the user terminal 5, respectively, when a single press of the proceed button 406 has been detected. The clipboard of the user terminal 5 is not readily affected by updates to the specifications of the video sharing service 3 and the message sharing service 4. Furthermore, the image folder of the user terminal 5 is not readily affected by updates to the specifications of the video sharing service 3 and the message sharing service 4. That is, the message posting assistance service 7 is not readily affected by updates to the video sharing service 3 and the message sharing service 4.

In addition, the text data 15 and the thumbnail image data 12 can be stored in the clipboard and the image folder, respectively, by a single press of the proceed button 406. The message posting assistance service 7 can thus alleviate the poster's burden of creating the message 13.

In the above-described embodiment, the message posting assistance service 7 provides the proceed button 406 independently from the second icon 405 in the message posting assistance page 400. The proceed button 406 is not limited to being provided in such a manner, and another button or icon may serve as the proceed button 406. For example, the second icon 405 may be the proceed button 406. In other words, the automatic processing may further include (c) activating the message sharing service 4.

The automatic processing may further include (d) moving or copying the text data 15 from the clipboard to the fourth window 601 in the new message creation page 600 when the message sharing service 4 has been activated.

The automatic processing may further include (e) displaying a preview of the thumbnail image data 12 in the third window 403 when the thumbnail image data 12 has been downloaded.

As described above, in block 203 illustrated in FIG. 2, the message posting assistance service 7 accepts the video URL 16 via the message posting assistance page 400. The video URL 16 may be input by the poster via a keyboard displayed on the user terminal 5. Alternatively, the video URL 16 may be copied from the video sharing service 3 as described below.

Figure 3:
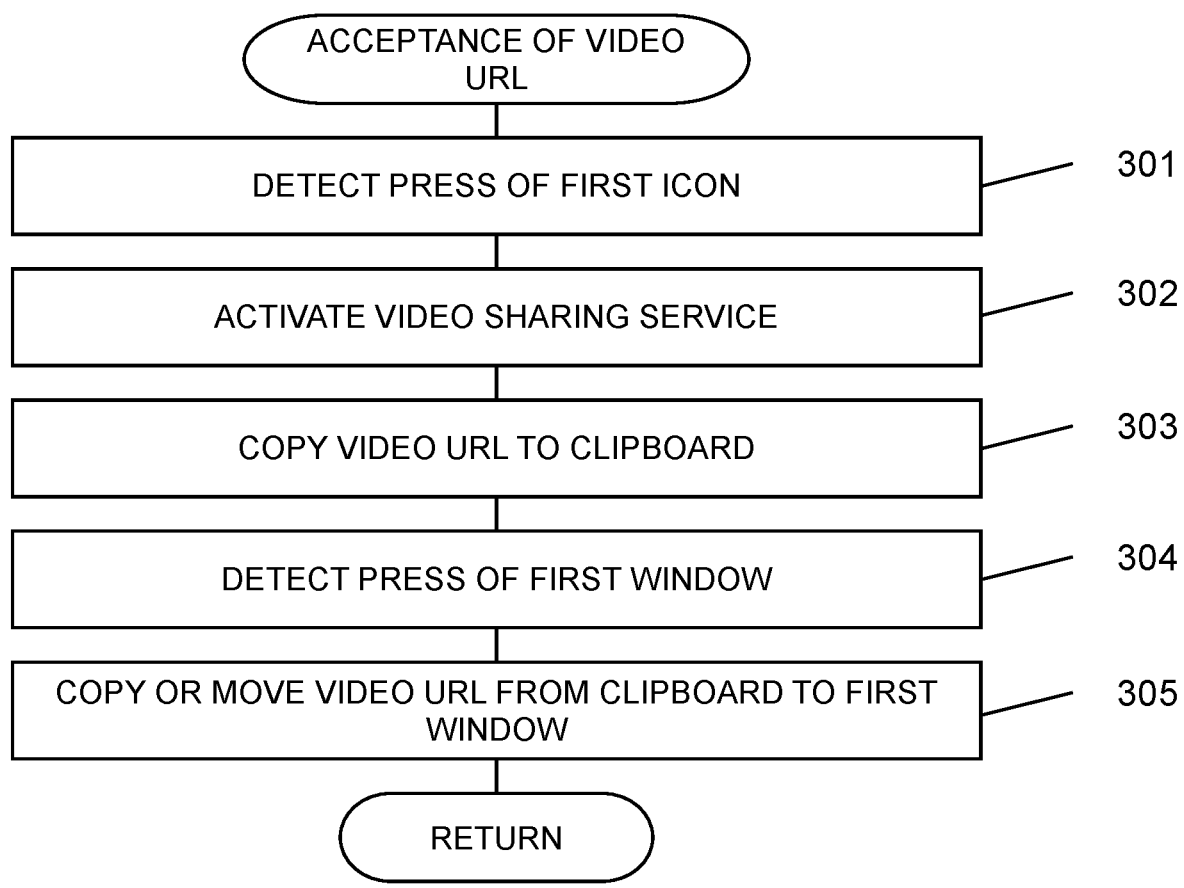
FIG. 3 is a flowchart illustrating an example of processing for accepting a video URL.

FIG. 3 is a flowchart illustrating an example of the processing for accepting the video URL.

In block 301, the message posting assistance service 7 detects a press of the first icon 404 in the message posting assistance page 400. As described above, the first icon 404 is an icon for accessing the video sharing service 3.

Figure 7:
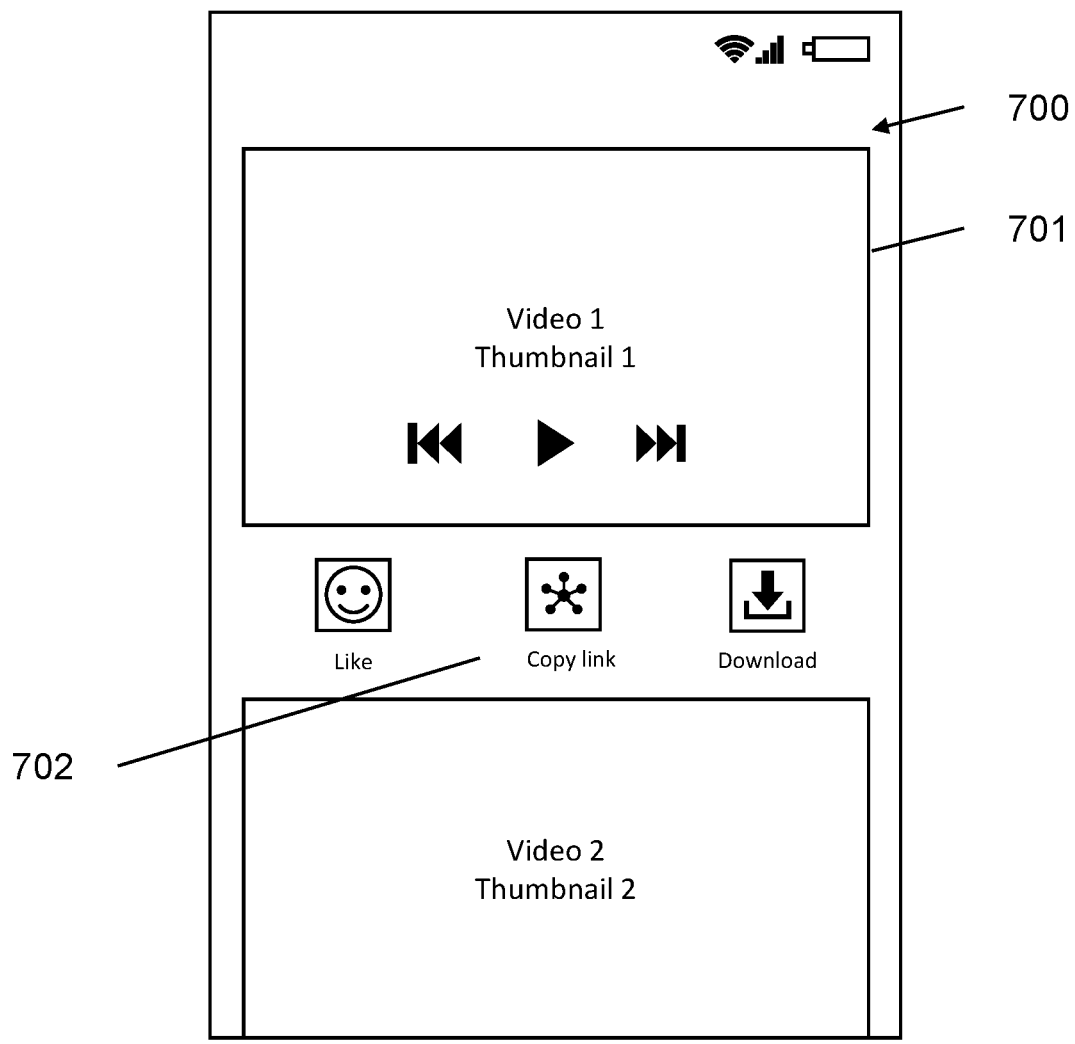
FIG. 7 illustrates an example of a main page provided by a video sharing service.

In block 302, the message posting assistance service 7 causes the user terminal 5 to access the video sharing service 3 when a press of the first icon 404 has been detected. The video sharing service 3 provides the user terminal 5 with a main page 700 as illustrated in FIG. 7, for example. For example, the main page 700 includes a thumbnail image 701 and a share button 702. From the main page 700, the poster can find a video that the poster would like to let the viewer know of In the present embodiment, the thumbnail image 701 is generated using the thumbnail image data 12. The share button 702 is a button for copying the video URL 16 to the clipboard of the user terminal 5.

Returning to FIG. 3, in block 303, the video sharing service 3 detects a press of the share button 702, identifies the video URL 16 of the video data 11 associated with the thumbnail image data 12, and copies the video URL 16 to the clipboard of the user terminal 5. The poster returns to the message posting assistance page 400 once again.

In block 304, the message posting assistance service 7 detects a press of the first window 401.

In block 305, the message posting assistance service 7 moves or copies the video URL 16 from the clipboard to the first window 401 when a press of the first window 401 has been detected.

The message posting assistance page 400 includes the first icon 404 and the second icon 405 for activating the video sharing service 3 and the message sharing service 4, respectively. That is, the message posting assistance page 400 provides users with easy access to the video sharing service 3 and the message sharing service 4.

In an embodiment, the system 1 includes a plurality of different video sharing services. The message posting assistance page 400 may include a plurality of first icons 404 for individually activating the plurality of different video sharing services.

In an embodiment, the system 1 includes a plurality of different message sharing services. The message posting assistance page 400 may include a plurality of second icons 405 for individually activating the plurality of different message sharing services.

In an embodiment, the message posting assistance page 400 may include individual windows for accepting the text data 15 and the video URL 16 from the poster.

In an embodiment, in response to the video URL 16 being accepted via the first window 401, the message posting assistance service 7 may download the thumbnail image data 12 from the video sharing service 3 based on the video URL 16 and store the thumbnail image data 12 in the image folder of the user terminal 5. In other words, the method according to this embodiment is a method to be used in a message posting assistance service that assists user work for posting a message including thumbnail image data and text data to a message sharing service, the thumbnail image data relating to video data posted to a video sharing service, the text data being accepted via a user terminal, and the message sharing service being different from the video sharing service. This method includes providing the user terminal with page data for rendering a message posting assistance page that includes a first window and a proceed button. This method further includes accepting the text data via the first window. This method includes accepting, via the first window, a video URL for identifying the video data. This method further includes, in response to the video URL being accepted via the first window, downloading the thumbnail image data from the video sharing service based on the video URL and storing the thumbnail image data to an image folder of the user terminal. This method further includes, in response to a press of the proceed button, moving or copying the text data from the first window to a clipboard of the user terminal.

What is claimed is:

1. A method to be used in a message posting assistance service that assists user work for posting a message including thumbnail image data and text data to a message sharing service, the thumbnail image data relating to video data posted to a video sharing service, the text data being accepted via a user terminal, and the message sharing service being different from the video sharing service, the method comprising:
providing the user terminal with page data for rendering a message posting assistance page that includes a first window and a proceed button;
accepting the text data via the first window;
accepting, via the first window, a video URL for identifying the video data; and
in response to a single press of the proceed button, proceeding with automatic processing including:
(a) moving or copying the text data from the first window to a clipboard of the user terminal; and
(b) downloading the thumbnail image data from the video sharing service based on the video URL and storing the thumbnail image data to an image folder of the user terminal.

2. The method according to claim 1, wherein the automatic processing further includes (c) activating the message sharing service.

3. The method according to claim 1, wherein
the message posting assistance page further includes a second window, and
the method further comprises:
presenting at least one recommended hashtag in the second window; and
in response to a press of the at least one recommended hashtag, moving or copying the at least one recommended hashtag from the second window to the first window.

4. The method according to claim 1, wherein the message posting assistance page includes a first icon and a second icon for activating the video sharing service and the message sharing service, respectively.

5. A method to be used in a message posting assistance service that assists user work for posting a message including thumbnail image data and text data to a message sharing service, the thumbnail image data relating to video data posted to a video sharing service, the text data being accepted via a user terminal, and the message sharing service being different from the video sharing service, the method comprising:
providing the user terminal with page data for rendering a message posting assistance page that includes a proceed button;
accepting the text data via the message posting assistance page;
accepting, via the message posting assistance page, a video URL for identifying the video data; and
in response to a press of the proceed button, proceeding with automatic processing including downloading the thumbnail image data from the video sharing service to the message posting assistance service based on the video URL.

6. The method according to claim 5, wherein the automatic processing further includes moving or copying the text data from the message posting assistance page to a clipboard of the user terminal.

7. The method according to claim 5, wherein the automatic processing further includes activating the message sharing service.

8. The method according to claim 5, wherein
the message posting assistance page further includes a first window and a second window,
the accepting of the text data via the message posting assistance page includes accepting the text data via the first window and displaying the text data on the first window, and
the method further comprises:
presenting at least one recommended hashtag in the second window; and
in response to a press of the at least one recommended hashtag, moving or copying the at least one recommended hashtag from the second window to the first window.

9. The method according to claim 5, wherein the message posting assistance page includes a first icon and a second icon for activating the video sharing service and the message sharing service, respectively.

* * * * *